July 30, 1963  H. G. KLEMM ETAL  3,099,203
BALING MACHINES
Filed June 7, 1961  3 Sheets-Sheet 1

INVENTORS.
HERMAN G. KLEMM &
BY WILLIAM A. WATHEN

Wolfe, Hubbard, Voit & Osann
ATTORNEYS.

INVENTORS.
HERMAN G. KLEMM &
BY WILLIAM A. WATHEN

ATTORNEYS.

United States Patent Office 3,099,203
Patented July 30, 1963

3,099,203
BALING MACHINES
Herman G. Klemm, Birmingham, and William A. Wathen, Detroit, Mich., assignors to Massey-Ferguson Inc., Detroit, Mich., a corporation of Maryland
Filed June 7, 1961, Ser. No. 115,578
2 Claims. (Cl. 100—19)

The invention relates to baling machines generally and more particularly to machines for baling hay, straw, and comparable crop materials.

One object of the invention is to provide a baling machine of the above general character operative to produce bales in pairs of a reduced size which are more easily handled by mechanized handling apparatus than conventional sized bales.

Another object is to provide baling mechanism operative to produce bales in pairs, each of which is approximately half the size of a conventional bale.

Still another object is to provide a baling machine adapted to produce bales approximately half the size of normal bales which utilizes with little or no change the major elements of a conventional baler such as the material feeding, bale forming and bale tying mechanisms.

Other objects and advantages of the invention will become apparent from the following detailed description of the preferred embodiment illustrated in the accompanying drawings, in which FIGURE 1 is a perspective view of a baling machine embodying the features of the invention.

While a preferred embodiment of the invention has been shown as incorporated in a particular type of baling machine, it is to be understood that this is merely exemplary and that there is no intention to limit the invention to details of the exemplary embodiment or to application to bailing machines of the type shown. On the contrary, the intention is to cover all modifications and adaptations falling within the spirit and scope of the invention as more broadly or generally characterized in the appended claims.

For purposes of illustration, the invention has been shown as incorporated in a mobile or field baler B adapted to be mounted at the side of a tractor T which supplies motive power to the implement, as well as power for driving its operating parts. The particular baler shown is similar to that disclosed in the Nelson patent, 2,862,347, issued December 2, 1958, to which reference may be had for a description of the detailed structure and mode of operation of the baler.

Figure 1:
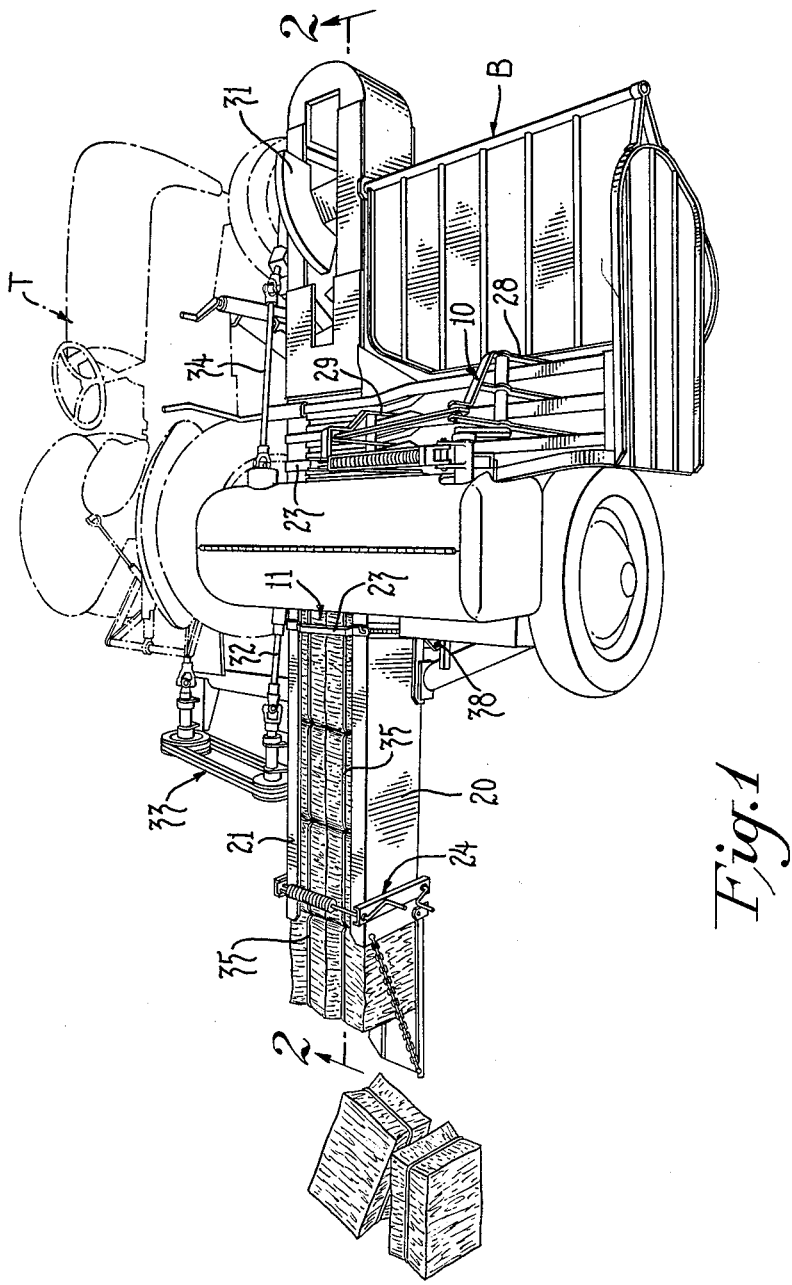
Figure 2:
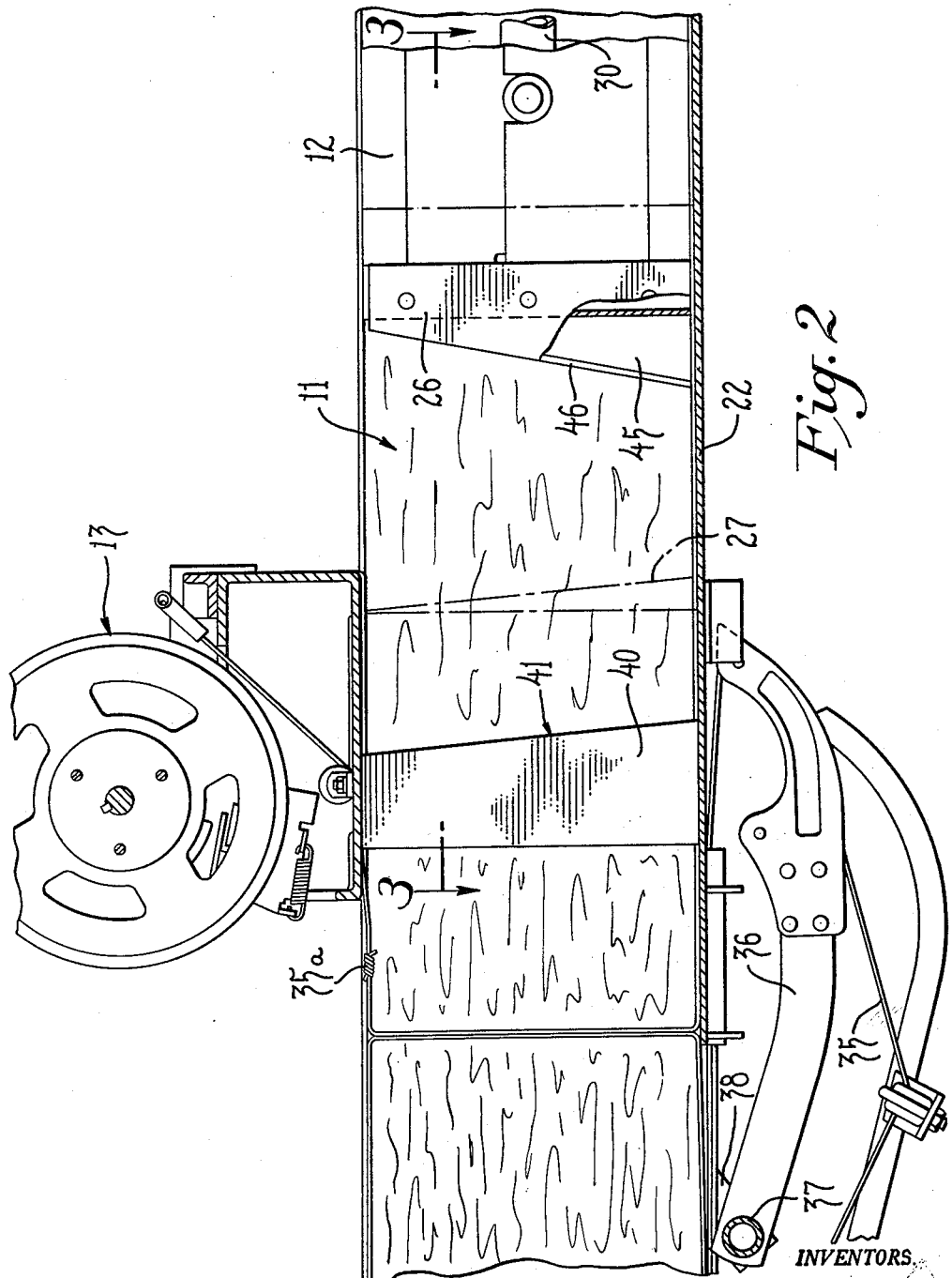
FIG. 2 is a fragmentary sectional view taken through the baling chamber in a plane substantially on the line 2—2 of FIG. 1.

In general, the baler B is made up of a group of interrelated mechanisms assembled into a compact mobile unit adapted to be coupled in side-by-side relation with the tractor T. The particular baler shown has mechanism for picking up crop material from the ground and transfer mechanism indicated generally at 10 for moving the picked up material laterally and feeding it in successive batches into a baling chamber 11. A plunger 12 reciprocating in the baling chamber compresses the batches of material into compact bales which, upon reaching predetermined dimensions, are tied with strands of twine or wires by tying mechanism 13 (FIG. 2).

In the exemplary baler, the baling chamber 11 is an elongated tunnel-like chamber of rectangular cross section open at its rear end for the ejection of the bales formed therein. The chamber is defined by channel-shaped side wall members 20 and 21 assembled face-to-face in spaced parallel relation. The top flanges of the side members extend over and form a partial top wall for the chamber which has a bottom wall formed by a plate 22.

Cross braces 23 extending between side members 20 and 21 hold them in predetermined spaced relation and thus retain the fixed dimensions of the chamber at its forward end portion in which the bale formation takes place. Adjacent the rear portion of the chamber, the side members 20 and 21 are left free to flex laterally so that the cross section of the chamber may be adjusted by mechanism 24 provided for that purpose. In practice, the adjustment is such that the cross sectional area of the chamber is reduced as compared to the area of the forward portion in which the bales are actually formed. Accordingly, passage of the bales along the chamber toward the discharge end is frictionally resisted and this resistance determines the degree to which the bale in course of formation is compressed.

In the exemplary baler, material to be baled is fed to the baling chamber automatically through an inlet opening 25 (FIG. 3) in one wall, in this instance, in the side wall member 20. The opening is located so that the plunger 12 slides past in its rearward or pressure stroke and a blade 26 carried by the plunger coacts with a blade 27 on the side wall member to shear off any material projecting through the opening. The material is fed through the opening 25 in successive batches by the transfer mechanism 10 which, for that purpose, has a pair of oscillating forks 28 or 29 operating in well-known manner to advance the material along a horizontal platform to which it has been delivered by conventional pick-up mechanism.

The plunger 12 is reciprocated by suitable means such as a pitman 30 and counterbalanced crank 31 driven through suitable gearing from a main drive shaft 32. The drive shaft receives power from the power take-off shaft of the tractor T by way of a V-belt drive connection 33. A branch shaft 34 from the drive mechanism extends to and drives the transfer mechanism 10.

In the operation of the baler, successive batches of material fed through the opening 25 to the baling chamber are pushed back and compressed against the preceding bale in each pressure stroke of the plunger 12. As explained before, the aft or discharge end of the baling chamber is adjusted to resist movement of the bale through the chamber and consequently the batches of material are compressed to the degree required to overcome the resistance. As the bale increases in size, it moves progressively along the baling chamber. A metering device of well-known construction continuously measures the growing bale and, when it reaches the preselected size, initiates the operation of the tying mechanism 13.

Bale tying mechanisms are available for use with twine or with baling wire. The mechanism 13 shown is of the latter type and is adapted to wrap two strands 35 of wire around the bale longitudinally, unite the ends of the strands by twisting them together as at 35a and sever the united strands from the supply strand. The severed ends of the supply strands are suitably clamped in the twisting sections of the bale tying mechanism and the strands are extended across the baling chamber 11 and threaded over a pair of needles 36 interposed between the baling chamber and the wire supply spools.

The needles 36 are mounted on a cross shaft 37 extending transversely of the baling chamber and carried at the free ends of a pair of arms 38 pivoted to swing forwardly from the position in which they are shown in FIG. 2. In this swinging movement the needles are projected through slots 39 in the wall 22 of the baling chamber and carry the strands around the forward end of the bale and alongside the ends of the strands clamped in the twisting section of the tying mechanism. The ends of the strands are then united by twisting them together and the loops around the bales are severed from the supply strands to free the bale.

While the tying mechanism may be arranged so that needles 36 travel in a horizontal plane through the side walls of the bale chamber, they have been shown here as traveling in vertical planes through slots in the bottom wall of the chamber. The present invention is applicable to balers having tying mechanism arranged in either of the above ways and adapted to tie the bales with at least two laterally spaced strands of either twine or wire.

In carrying out the invention provision is made for dividing each bale into two parts along a plane substantially at its center line to produce two smaller bales, that is, two approximately half-size bales, each tied with at least one strand of twine or wire. The division of the basic bale may be effected in various ways, either after its complete formation, or during the process of formation. In case the bales are to be divided after they are formed and tied, cutting means is provided between the bale forming section of the chamber 11 and the discharge end of the chamber. The cutting means may be of any preferred character, comprising a stationary or movable blade with either a serrated or a plain sharp edge. When a movable blade is employed, suitable power actuated means is provided for driving the same. The cutting blade, of course, is mounted so as to extend transversely across the baling chamber either vertically or longitudinally, depending upon the needle arrangement employed in the bales. In either case, the blade is located substantially at the center line of the baling chamber midway between the needles 36.

Figure 3:
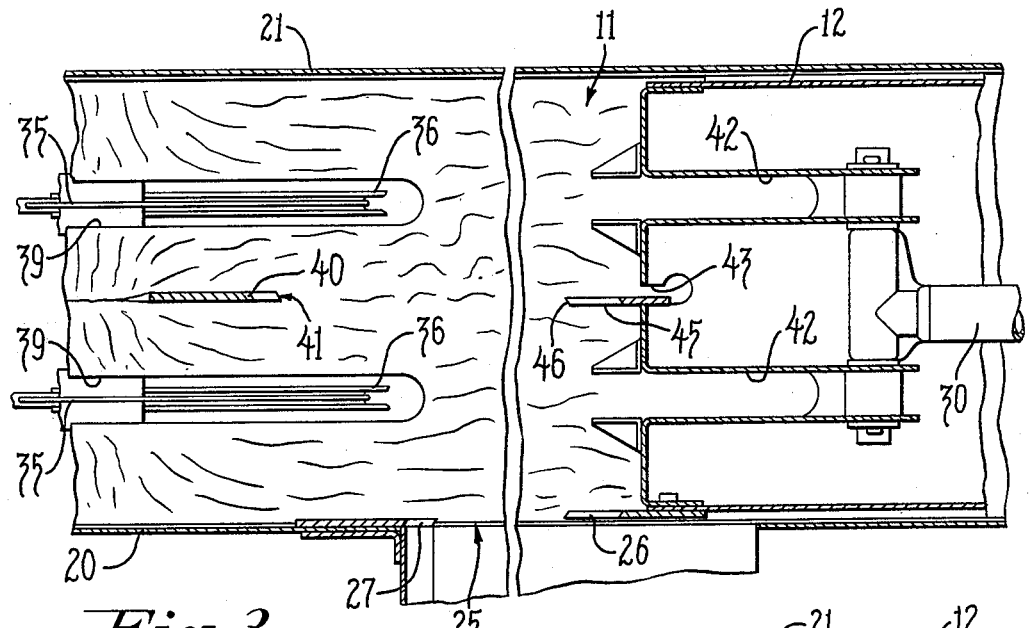
FIG. 3 is a fragmentary sectional view through the baling chamber taken in a plane substantially on the line 3—3 of FIG. 2, showing the baling plunger at the beginning of a pressure stroke.
Figure 4:
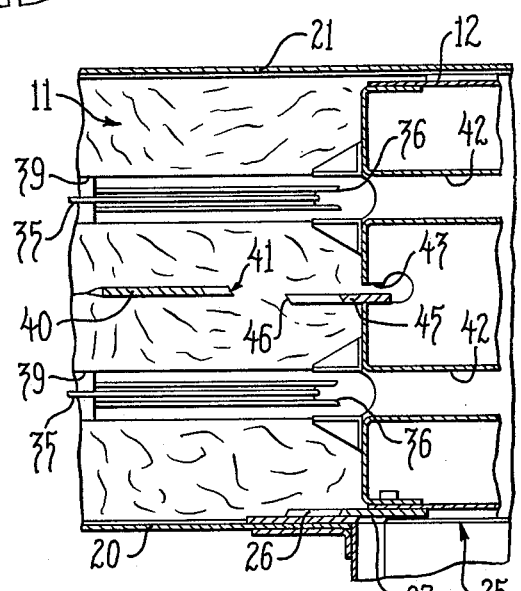
FIG. 4 is a fragmentary sectional view through the baling chamber taken on the same plane as the preceding figure but showing the baling plunger partially advanced in a pressure stroke.
Figure 5:
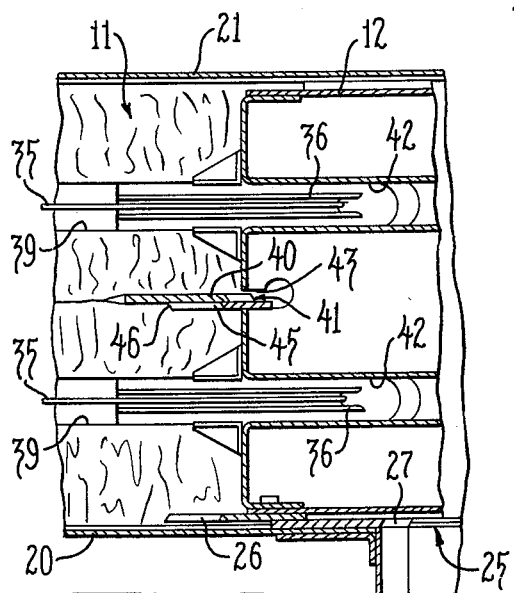
FIG. 5 is a fragmentary sectional view through the baling chamber taken in the same plane as the preceding figures but showing the plunger in the fully advanced position following a pressure stroke.

Division of the bales during their formation is preferred, as it can be effected with very simple and durable apparatus. For this purpose, a stationary blade 40 is mounted in the forming section of the baling chamber so as to extend transversely across the chamber midway between the slots 39 for the passage of the needles 36. The blade 40 as shown comprises a flat steel bar with its forward edge beveled to define a sharp cutting edge 41 coplanar with one surface of the blade. Preferably the blade is tapered slightly to present the cutting edge of the blade 41 inclined to a plane normal to the axis of the baling chamber as shown in FIG. 2 and with its central portion approximately in a plane corresponding to the limit position of the face of the baling plunger 12. As shown in FIGS. 3–5, the plunger presents a generally flat face with spaced recesses 42 to afford clearance for the needles 36 and with a central vertically disposed recess 43 to accommodate the stationary blade 40.

For cooperation with the blade 40 a second blade 45 is mounted on the plunger 12, in this instance, with its forward edge portion disposed within the recess 43 and its rear edge portion projecting beyond the face of the plunger. This blade may also comprise a flat steel bar with its trailing edge beveled oppositely to the bevel of the blade 40 to define a cutting edge 46. The blade 45 is preferably tapered oppositely to the taper of the blade 40 so that the cutting edges of the blade engage progressively to exert a shearing action on material between them as the plunger advances to the limit of its compression stroke.

With the blade arrangement above described, the material in each batch being compressed into the bale is cut at the center of the baling chamber in the final stage of compression by the plunger 12. The cut is clean and provides a sharp line of demarcation between the severed bale sections which remain stable as the bale travels rearwardly through the restricted portion of the baling chamber. As there is no intermingling of the fibers of the two sections, they fall apart naturally upon discharge from the baling chamber, each section being tied by one-half of the strands applied to a full size bale.

It will be apparent from the foregoing that the invention provides a baling machine of novel and advantageous construction operative to produce bales of a size that can be handled easily and efficiently by mechanized handling apparatus. It is to be particularly noted that while the improved baler produces bales smaller than conventional size, it does so at a greatly accelerated rate, producing two bales simultaneously instead of one bale in each operating cycle. Also to be noted is the fact that the invention is readily applicable to conventional balers without requiring any substantial structural changes in the major components of the baler.

We claim as our invention:

1. In a baler, in combination, side, top and bottom members defining an elongated chamber of generally rectangular cross section having an inlet opening in one of the walls, means supporting a pair of tying strands across said chamber in spaced parallel relation, means for feeding successive batches of the material to be baled through said inlet opening forwardly of said strands, a plunger reciprocable in said chamber operative in its advance to compress the material into a bale and to gradually push the bale along the chamber as it is formed, said strands being pulled out and laid along the sides of the bale as it moves along the chamber, means including a pair of needles operative to wrap the strands around the end of the completed bale and to securely unite the ends of each of the strands, a stationarily supported blade element extending across said chamber substantially midway between said strands, and a blade element carried by said plunger coacting with said stationary blade element to shear the material being pressed into the bale whereby the completed bale is formed in two sections divided in a plane substantially midway between the two tying strands.

2. In a baler, in combination, side, top and bottom members defining an elongated chamber of generally rectangular cross section having an inlet opening in one of the walls, means supporting a pair of tying strands across said chamber in spaced parallel relation, means for feeding successive batches of the material to be baled through said inlet opening forwardly of said strands, a plunger reciprocable in said chamber operative in its advance to compress the material into a bale and to gradually push the bale along the chamber as it is formed, said strands being pulled out and laid along the sides of the bale as it moves along the chamber, means including a pair of needles operative to wrap the strands around the end of the completed bale and to securely unite the ends of each of the strands, a stationarily supported shearing blade extending across said chamber substantially midway between said strands, said blade having its cutting edge disposed forwardly of the limit position to which said plunger moves in its advance, a second blade carried by said plunger in position to cooperate with the cutting edge of said stationary blade in the advance of the plunger so as to shear each batch of material approximately at the center of the baling chamber whereby the bale is formed in two separate sections each tied by a single strand.

References Cited in the file of this patent

UNITED STATES PATENTS

| | | |
|---|---|---|
| 315,960 | Piatt | Apr. 14, 1885 |
| 729,149 | Fenn | May 26, 1903 |
| 2,862,347 | Nelson | Dec. 2, 1958 |
| 2,923,230 | Bornzin | Feb. 2, 1960 |

FOREIGN PATENTS

| | | |
|---|---|---|
| 138,427 | Germany | Feb. 3, 1903 |
| 165,626 | Germany | Nov. 28, 1905 |
| 557,110 | Great Britain | Nov. 4, 1943 |
| 846,395 | Great Britain | Aug. 31, 1960 |
| 94,408 | Sweden | Jan. 26, 1939 |